United States Patent [19]

Pillette

[11] Patent Number: 4,466,273
[45] Date of Patent: Aug. 21, 1984

[54] LEAK DETECTION SYSTEM

[76] Inventor: Kibbie P. Pillette, P.O. Box 456, Abbeville, La. 70510

[21] Appl. No.: 292,121

[22] PCT Filed: Oct. 29, 1980

[86] PCT No.: PCT/US80/01447
§ 371 Date: Jul. 20, 1981
§ 102(e) Date: Jul. 20, 1981

[87] PCT Pub. No.: WO82/01591
PCT Pub. Date: May 13, 1982

Related U.S. Application Data

[63] Continuation-in-part of Ser. No. 954,578, Oct. 23, 1978, Pat. No. 4,232,736, which is a continuation-in-part of Ser. No. 786,576, Apr. 11, 1977, abandoned.

[51] Int. Cl.³ .............................................. G01M 3/28
[52] U.S. Cl. ................................... 73/46; 73/40.5 R
[58] Field of Search ................. 73/46, 40.5 R, 49.1, 73/49.5; 166/53; 285/13, 93; 138/99

[56] References Cited

U.S. PATENT DOCUMENTS 2,766,614  10/1956  Cook ........................................ 73/46
3,996,789  12/1976  Wilson ................................ 73/46 X

FOREIGN PATENT DOCUMENTS 812848  9/1951  Fed. Rep. of Germany .......... 73/46
999965  10/1951  France ..................................... 73/46
504638  4/1939  United Kingdom .................... 73/46
625592  6/1949  United Kingdom .................... 73/46

Primary Examiner—S. Clement Swisher
Assistant Examiner—Joseph W. Roskos
Attorney, Agent, or Firm—Charles C. Garvey, Jr.

[57] ABSTRACT

A leak detection method and apparatus is disclosed, the apparatus comprising an enclosing temporary removable casing member which is connectable about a section of piping to be tested. The casing member provides openings which allow the passage of a section of piping to be tested therethrough, with the portion to be tested being sealably housed on the inner portion of the casing. The casing thus provides an inner leak recovery collection space between the casing and the section of the piping to be tested. The casing in the preferred embodiment is comprised of a pair of casing halves which are structurally connected about the section of piping to be tested by means of a bolted connection, for example, with flanged mating surfaces of each casing half registering and abutting to form a sealable connection about the section of the pipe to be tested. A suitable sealing interface is provided which can be, for example, in the form of a gasket member between the respective casing halves as well as between the piping section to be tested and the openings in the casing. A control valve mounted in the wall of the casing senses the presence of leakage within the casing member attached to the pipe.

8 Claims, 7 Drawing Figures

LEAK DETECTION SYSTEM

This is a continuation-in-part of application Ser. No. 954,578 filed Oct. 23, 1978, now U.S. Pat. No. 4,232,736.

TECHNICAL FIELD

The present invention relates to piping and piping control systems, but more particularly, the present invention relates to the detection of leaks in the fitting portion of piping systems and the subsequent closure of the valves and like controls coincident with the occurrence of such a leak. Even more particularly, the present invention relates to a portable apparatus for detecting leaks in a suspect fitting portion of a pipeline with a bladder structure being portable and attachable to any existing piping system in a sealable fashion, the bladder thereafter collecting leaks.

BACKGROUND ART

In all piping systems, there is utilized generally a number of "fittings" which are used to configure the pipline or piping system to a desired chemical plant, or to the terrain across which it is flowing, or otherwise to change the pipeline configuration and position. Such fittings are known in the art as elbows, tees, crosses, valves, flanges, and the like. A fitting is generally referred to hereinafter as any portion of a pipeline which is connectable to a normal pipe joint, the fitting being a portion of the pipeline which can create turbulence and which can be a spot for potential leaks.

Leaks in fittings are generally created by corrosion or mechanical deterioration. This is often seen in the oil and gas industry where natural gas and/or oil flowing from a well is often combined with sand and the flowing produces a sandblasting effect. This sandblasting effect especially eats away at elbows, tees, choke jackets, and valves when the pipeline makes a turn. It is known in the art that turbulence is increased at such turning points in the pipeline.

In the production of natural gas, a well is normally drilled with a length of pipe known as a "drill string". The drill pipe is individually made up of sections which can be, for example, thirty feet (30'). The drill pipe is enclosed normally in a casing which is also welded or jointed. Casing is then cemented into place from the bottom up. At the head of the casing, the crew installs a master valve that may be closed quickly and surely to shut off the flow of gas. Above this valve is placed a "Christmas tree". A Christmas tree is merely an assembly of pipes and valves that allows the gas to flow into gathering lines. These gather the output of several wells and carry the fuel to the cross-country pipelines for remote transmission of the gas. It is to this general field that the present invention is directed.

Several devices have been patented which have attempted to provide a method for the detection of leaks in flow lines and in fittings which have been corroded by chemical or weather attack, or mechanically deteriorated as in the case with sand/gas combinations. The following table provides a list of some prior art devices which have been patented.

| PRIOR ART PATENTS | | |
|---|---|---|
| U.S. Pat. No. | Inventor(s) | Issue Date |
| 2,280,140 | J. H. Wilson | 04/21/42 |
| 2,607,225 | P. H. Biscoe | 01/23/48 |

| -continued | | |
|---|---|---|
| PRIOR ART PATENTS | | |
| U.S. Pat. No. | Inventor(s) | Issue Date |
| 2,765,801 | F. E. Selim | 10/09/56 |
| 2,937,520 | A. Bell | 05/24/60 |
| 3,339,415 | W. Wild | 09/05/67 |
| 3,339,728 | A. R. Taylor | 09/03/68 |

DISCLOSURE OF INVENTION

The present invention provides a simple and economical system for the detection of minute leaks in flow lines, and a method for the shut-off of flow within the line if a catastrophic failure of the line occurs. Such a device is especially important in the oil and gas industry, and in the transmission of natural gas where pressures developed within flow lines can be quite high.

The present invention provides a portable bladder which can be quickly attached and jacketed into position around a particular fitting in any existing piping system which fitting may be suspect of subject to damage. Thus, the bladder could be placed around the fittings which would experience a maximum amount of turbulence, mechanical deterioration, or corrosion.

The present invention solves all these prior art problems and shortcomings by providing a portable bladder apparatus which is comprised generally of a pair of bladder shell halves which can be fitted together in a sealable fashion about a portion of an existent pipeline (such as an elbow or like fitting) where leaks may occur. The bladder provides a pair of shell sections, each section having sealing mating surfaces which correspond to one another and join together in an encapsulating sealing fashion about the suspect fittings. The bladder could be manufactured in a variety of desired shapes so as to properly encapsulate the subject fitting which is suspect for corrosion, mechanical deterioration, or leakage. In the preferred embodiment, a valve apparatus or regulator is provided which "senses" the presence of a leak and can be through gas instrumentation, for example, thereafter close a valve, for example, thus shutting off the flow of fluid through the pipeline and avoiding continued leakage and in the case of dangerous, volatile or hazardous materials, a possible catastrophe.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

BEST MODE FOR CARRYING OUT THE INVENTION

Figure 1:
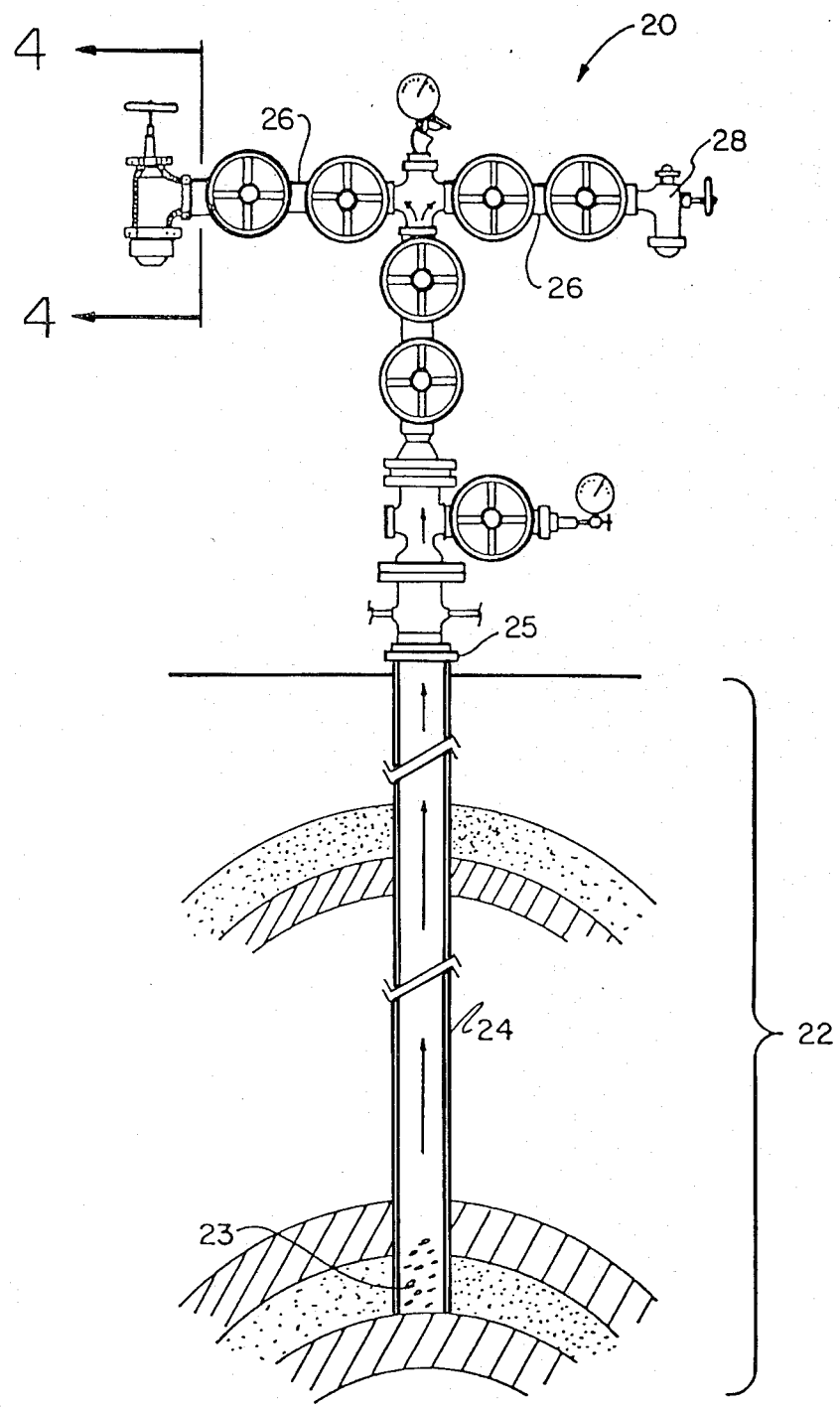
FIG. 1 is a schematic view of a typical oil and gas well illustrating the master valve and pipe assembly at the top portion of the well.

FIG. 1 illustrates a typical piping system with which the present invention has application, the system being a conventional oil and gas well showing a Christmas tree 20 mounted on the oil and gas well 22 itself. As can best be seen from FIG. 1, oil and gas enters the bottom portion of the well through screen pipe 23 and moves upwardly through tubing 24 to Christmas tree 20. Christmas tree 20 is attached at casing assembly 25 with, for example, a flanged connection. As can best be seen from FIG. 1, the gas flows upwardly (see arrows) through Christmas tree 20 and passes laterally through manumatic valves 26 and then through choke jackets 28. Often a certain amount of sand or like abrasive material is combined with the oil and gas, creating a mechanically erosive effect akin to sandblasting on the inside of Christmas tree 20 and more particularly within the fittings, such as choke jacket 28. Choke jacket 28 is thus "suspect" in that the mechanically erosive effect of flow can eventually cause minute leaks which continuously grow until failure of the fitting or choke jacket occurs with the escape of volatile and polluting oil/gas presenting a hazard to property, lives and the environment.

FIG. 1 illustrates the portion of the oil and gas well to which the present invention could be directed in an exemplary installation, (i.e., the Christmas tree). It should be understood that the present invention could be applied to any piping situation where a particular fitting or section of pipe is subject to corrosion or failure and subsequent leaks. Thus, the present invention would be particularly useful in hazardous industries where even minute leaks would be either harmful, wasteful or even disastrous to property, lives, and the environment.

The Christmas tree 20 shown in FIG. 1 is provided with manumatic valves 26 which control the flow of natural gas from the well 22 to transmission pipelines. As can be seen by the arrows in FIGS. 1, 2 and 3, the gas flows upwardly and then laterally through valves 26 to choke jackets 28. Choke jackets 28 often experience high turbulence and corresponding mechanical erosion and therefore can be a potential source of leaks.

Figure 2:
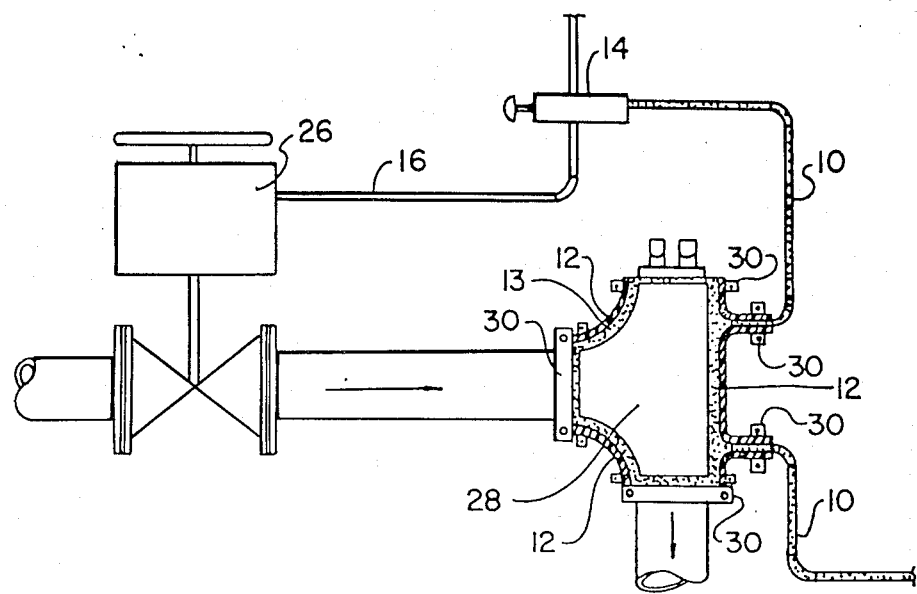
FIG. 2 is a schematic diagram of the preferred embodiment of the apparatus of the present invention.
Figure 3:
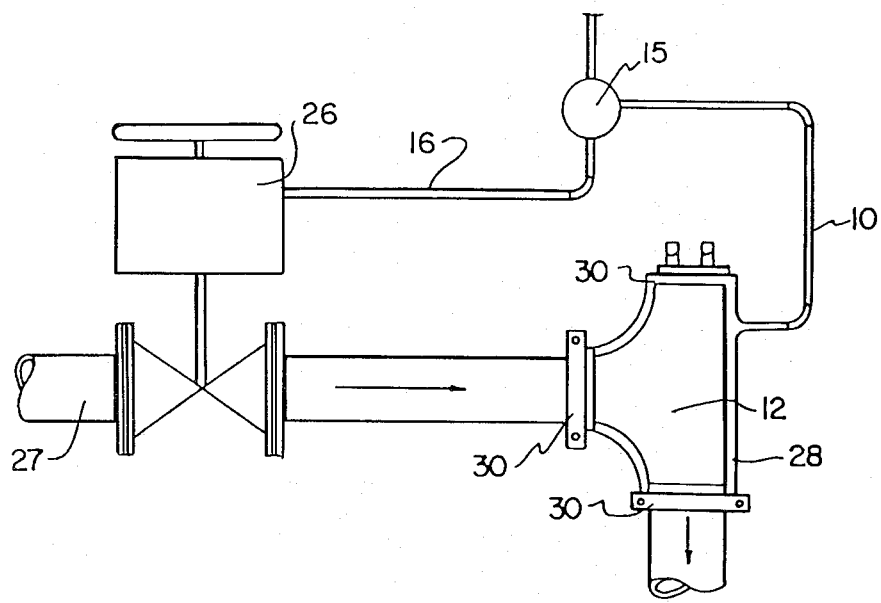
FIG. 3 is a schematic diagram of an alternative embodiment of the apparatus of the present invention.

FIGS. 2 and 3 illustrate schematic piping diagrams of the preferred embodiment and alternative embodiments of the apparatus of the present invention illustrating their connection with the manumatic valves 26 and choke jacket 28.

FIG. 2 provides the preferred embodiment of the apparatus of the present invention where a rupture of bladder 12 occurs often, a leak from choke jacket 28 is collected within bladder 12. In FIG. 2 can be seen manumatic valve 26 which is held in an open position by means of a supply of instrumentation control fluid flowing through conduit 16. Conduit 16 passes through controller 14 which can be a CRBBM type controller as manufactured by U.S.I. Controller 14 is held in a posture which allows high pressure fluid 16 to pass therethrough in order to maintain valve 26 in an open position as long as regulator 14 additionally receives low pressure control fluid through supply line 10. Interruption of instrumentation control fluid to controller 14 causes the controller to "shift" and interrupt the supply of instrumentation control fluid to valve 26. Since valve 26 requires a supply of control fluid to operate, it can be seen that an interruption in the supply of instrumentation control fluid in conduit 16 causes the valve 26 to close, halting the flow of fluids such as natural gas therethrough. As can be seen best in FIG. 2, supply conduit 10 feeds control fluid to bladder 12 and thereafter to regulator 14. It can be seen that a rupture of bladder 12 (as will occur when a leak from choke jacket 28 fills bladder 12) will interrupt the flow of instrumentation control fluid to regulator 14.

IN FIGS. 2 and 3, bladder 12 is shown encasing choke jacket 28, but it can be used on any suspect piping fitting where erosion could produce the occurrence of leaks from the fitting at any time without notice.

Figures 4, 4A, 5:
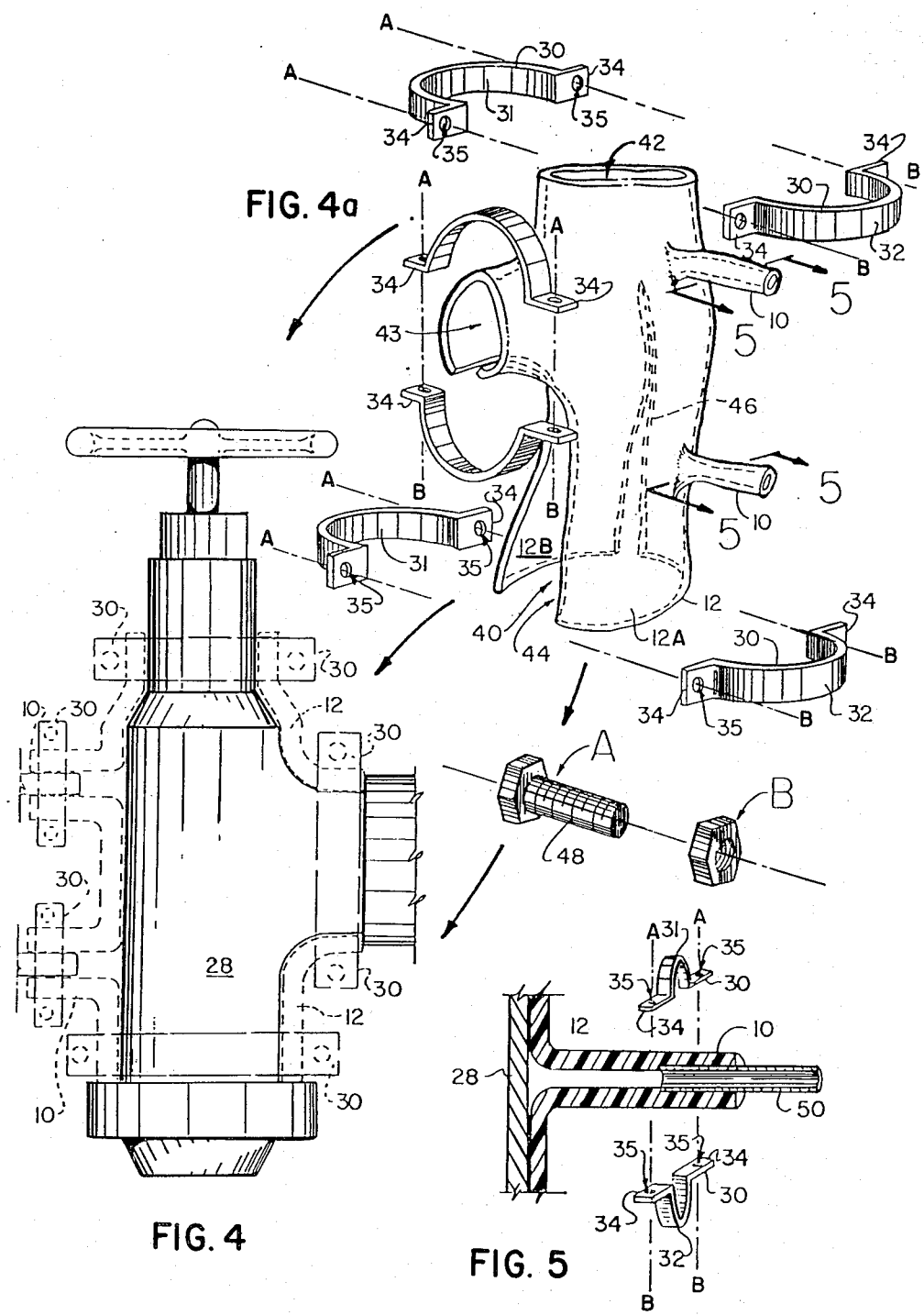
FIG. 4 is a sectional view of a typical choke jacket with the preferred embodiment of the apparatus of the present invention attached thereto in a sealable fashion.
FIG. 4A is a prospective exploded view of the bladder portion of the preferred embodiment of the apparatus of the present invention illustrating the pipe claps for holding the bladder to the suspect fitting in a sealable fashion.
FIG. 5 is a sectional view taken along lines 5—5 of FIG. 4A.

Bladder 12, as will be discussed more fully hereinafter, is attached to a suspect fitting such as a choke jacket 28 by means of, for example, a plurality of pipe clamps 30. The bladder would be generally open at one end portion, as it is illustrated in FIG. 4A, so that it could slip over the choke jacket. The slitted portion designated generally by the numeral 40 in FIG. 4A would be sealed by gluing or like closure while the openings 42-44 would be sealed by means of clamps 30, as is illustrated in FIG. 4A. Thus, a sealable encapsulating bladder 12 would be provided about any suspect fitting, with the end result that a leak occurring from the fitting 28 would be collected by the bladder and thereafter transmitted through a suitable conduit 45 to shut off apparatus or like indicating structure, as will be discussed more fully hereinafter, and as was illustrated heretofore in FIGS. 2 and 3. Note that an air space 13 can be provided between bladder 12 and fitting 28 into which air space leaks from fitting 28 will flow and thus be collected. Air space 13, likewise, provides a space into which instrumentation air can flow through conduits 10 enroute to controller 14, as was described more fully above.

FIG. 3 illustrates an alternative embodiment of the apparatus of the present invention which shows a typical manumatic control valve 26 controlling the flow of oil and gas from line 27 which leaves Christmas tree 20 (note FIG. 3). An instrumentation gas supply fed through conduit 16 and towards valve 26 maintains valve 26 in an "open" position. Regulator 15 can be, for example, a Fisher Model 164-A regulator set at approximately five to ten pounds in an exemplary installation.

Such a regulator as the Fisher Model 164-A is a three-way pneumatic switching valve. It is spring loaded and diaphragm actuated. A control connection to the regulator applies sufficient pressure to the diaphragm causing a valve plug within to shift and change the route of fluids flowing through the regulator.

Utilizing regulator 15, a normally open port within regulator 15 allows the control fluid supply to pass through conduit 16 and maintain valve 26 in an "open" position. If it is undesirable to maintain a pressure on bladder 12, as is done in the preferred embodiment, the alternative embodiment provides no pressure on bladder 12, but rather bleeds pressure through line 10 in the event of a leak within fitting 28. It can be seen that the leak from fitting 28 will be caught within bladder 12 and flow through conduit 10, causing a buildup of pressure within both bladder 12 and line 13 and shifting a piston or like valving member within regulator 15 to close the control fluid supply in conduit 16. The lack of this control fluid to valve 26 causes it to close (as is known in the art).

The embodiments of the present invention above disclosed provide a simple solution for the problem of early detection of leaks in suspect fittings of flow lines, for example, as in the choke jacket of a Christmas tree portion of a natural gas well.

As with the embodiment shown in FIG. 2, bladder 12 would be attached in an encapsulating fashion about the suspect fitting, such as a choke jacket 28 by using clamps 30, as is illustrated in FIG. 3. Clamps 30 can be, for example, generally "U" shape pipe clamps as is illustrated more particularly in FIGS. 4 and 4A.

FIGS. 4, 4A and 5 illustrate more particularly, the structure of bladder 12. Bladder 12 is in the preferred embodiment comprised of a generally flexible material such as, rubber, plastic film, or the like.

Such a pliable structure could easily be formed around a suspect fitting as is illustrated in FIG. 4 with a typical oil field choke jacket 28.

The sealing of bladder 12 about suspect fitting 28 would be accomplished, for example, by using a plurality of pipe clamps 30, as is illustrated in FIGS. 4 and 4A, each clamp 30 could be, for example, comprised of a pair of generally "U" shaped clamp halves 30, 32, with each clamp half providing outwardly depending tabs 34 with openings 35 therethrough. Clamp halves 31, 32 could be assembled by using a bolted connection 40 as illustrated best in FIG. 4A.

In FIG. 4A, a bladder 12 is provided which is shaped to generally fit over and encapsulate an oil field choke jacket 28. Note that a pair of slits 40, 46 are provided which will allow bladder 12 to be split partially into a pair of bladder halves 12A and 12B. Bladder halves 12A and 12B would be separated by hand and the entire bladder structure 12 pulled over the suspect fitting such as, choke jacket 28 and thereafter sealed using pipe clamps 30 as aforementioned. Slits 40 and 46 could be sealed by using glue or like suitable means. A rubber cement or rubber glue could be used to seal slits 46 and 40, if desirable.

The entire bladder structure 12 could be totally split into two separate halves which are not connected at all, if desirable. In such an instance, each half would be mounted to the pipe suspect fitting and thereafter glued along the slits 40 and 46 with the sealable connection to fitting 28 being completed using pipe clamps 30.

In FIGS. 4 and 5 there is seen a conduit 10 which is integrally attached to bladder 12. Each conduit line 10 is schematically illustrated in FIGS. 2 and 3 and provides a conduit which instrumentation gas (FIG. 2) or a collected leak (FIG. 3) could pass to perform the desired indication and shut off function.

It will be understood by one skilled in the art that the bladder structure 12 as taught by the present invention is totally portable and could easily be attached to any existing piping system while the piping system is in operation. Thus, the present invention provides a leak detection and shut off apparatus which would easily be added to existing gas wells, oil wells, or like piping systems where fittings are suspect and where leaks might occur with the result being possibly a loss of life or like catastrophe.

In FIG. 5 conduit 10 could connect to a section of conventional tubing 50 with the connection being perfected in a sealable fashion using clamps 30 and a bolted 48 connection.

The apparatus of the present invention is totally portable and capable of operating without the intervention of a human operator, and can thus avert the possiblity of any hazards caused by leakage, which can eventually lead to explosion, fire, or like threats to property, life, and the environment.

The present invention would allow a flow line control valve to be shut off, and stop the flow of gas from a gas well and thus avert the escape of gas through any minute leak which might occur in a suspect fitting which leak over a period of time in a remote area could grow with the continued escape of natural gas or like volatile fluid posing a hazard to both individuals and the environment. Such an early leak detection and valve closure system would save the unnecessary and wasteful loss of much fuel before the leak is detected, even in the case where a disaster does not occur.

Using the alternative embodiment, line 13 leaving bladder 12 (see FIG. 3) provides an instrumentation line which would operate any pressure or volume change responsive alarm, pressure guage or like indicator. Thus, as a leak in a suspect fitting occurred, the fluid would be trapped in bladder 12 and either pressure or volume or both would be transmitted to line 13 for operation of the desired indicator—the leak being detected.

Figure 6:
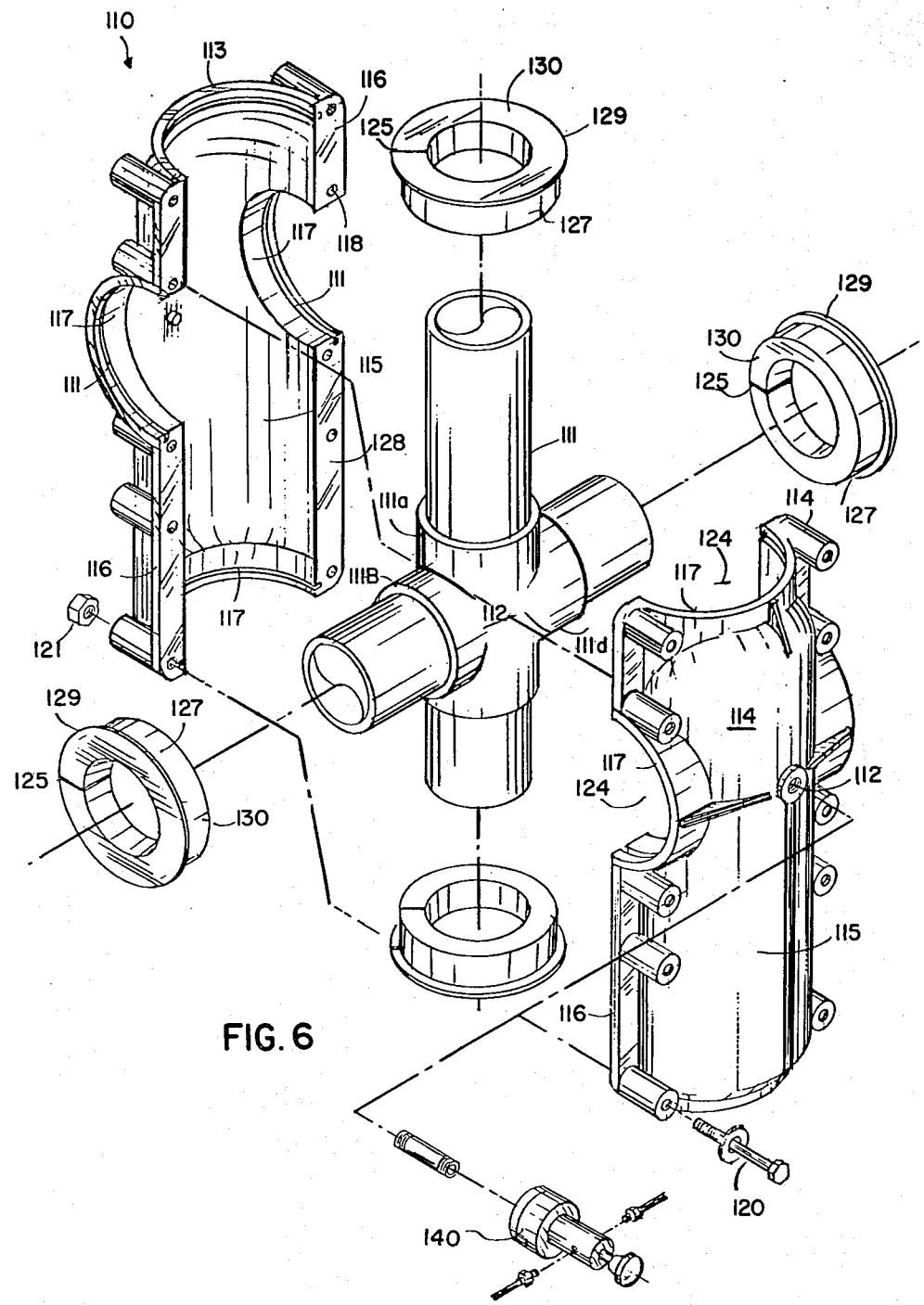

FIG. 6 best illustrates an additional embodiment of the apparatus of the present invention generally designated by the number 110. In FIG. 6, there can be seen a typical pipeline 111 which is comprised of a plurality of piping joints 111a through 111d adjoined at their end portion by attachments such as bolting or welding to a conventional type cross-fitting 112. This embodiment of the leak detection apparatus of the invention designated by the numeral 110 is comprised in FIG. 6 of a first casing half 113 and a second casing half 114. Each casing half 113 and 114 would provide a generally curved casing wall 115 having a thickness as needed to accommodate pressures within as will be described more fully hereinafter. The casing halves 113 and 114 further provided with flanges 116 as is illustrated in FIG. 6. Opening 118 is provided in each flange 116, which openings will accommodate bolt 120 and nut 121 as shown in FIG. 6, thereby completing a seal.

In FIG. 6 it can be further seen a sealing disc 130 which occupies an opening 124 when halves 113 and 114 are assembled. Sealing disc 130 is of a pliable material, such as rubber, for sealing between pipe 111 and opening 124 when valve 113 and 114 are bolted together. In the preferred embodiment sealing base 124 is adapted with groove 125 so that it may be fitted around the length of the pipe 111, and fitted in place. A rubber base adhesive sealant can be applied between the exterior circumference 127 of base 130 to more effectively seal the joints. Disc 130 also provides for annular shoulder 129 which acts as a peripheral sealing connecting surface when the apparatus 110 is assembled which would insert into groove 111 of apparatus 110, further establishing the seal therebetween. A regulator 140, such as a typical regulator valve, will be discussed more fully hereinafter, is adapted to apparatus 110 at point 112. The regulator 140 will sense the presence of a leak from the fitting housed within leak detection apparatus 110 and use the leak to perform a desired instrumentation function, such as shutting off the valve.

The encapsulating casing halves 113 and 114 as shown can be sealably attached to about any fitting such as a cross joint, for example, which is suspect or subject to leakage as often the case where pipelines carrying corrosive or mechanically abrasive material making turns through fittings or otherwise creating turbulence within the fitting that can cause a leak.

It is, however, with the rigid incapsulating leak detection apparatus 110 to trap leaks from the suspect fitting within the assembly casing halves 113 and 114.

A suitable regulator or control valve 140 can be attached to apparatus 110 in a sealable fashion at point 112. After the sealable attachment of casing halves 113 and 114 with the suspect fitting is accomplished, leaks occurring from the fitting can then be collected within the rigid casing 110 and there accumulation producing an increase in pressure and increase in volume which could then activate the regulator or control valve 140. It should be understood by one skilled in the art that the present invention can be used in a plurality of fittings as are known in the pipeline and the oil and gas art. For example, the present invention can be used with L-bolts, tees, valves, crosses and like fittings. The present invention provides a leak detection apparatus which provides a rigid bladder casing 110 which can be reasonably fixed about any fitting within a conventional pipe system, which fitting may be subject to be damaged by mechanical or chemical erosion and subsequent leakage.

In the preferred embodiment of the apparatus of the present invention 110, ring disc 130 would be inserted into the space between pipeline sections 111a through 111d and openings 24 to form a sealable connection between pipeline sections 111a through 111d and rigid bladder casing 110.

The detailed construction of bladder casing in its bladder halves 113 and 114 is best seen by viewing FIG. 6. As before mentioned, rigid bladder casing 110 is comprised of a pair of casing halves 113 and 114. Each casing half 113 and 114 is comprised of a curved bladder casing wall 115 having in the preferred embodiment four circular arcuate side ribs 113a which form openings 124 when casing halves 113 and 114 are assembled corresponding upper and lower side ribs 113a registering and abutting to form the desired circular openings 124.

Each casing half 113 and 114 is further comprised of a plurality of sealing flanges 116 which are generally rectangular and flat, and provide a means for assembling casing halves 113 and 114 together in a sealable fashion about a suspect fitting where corrosion and leakage may appear. Each flange 116 provides an inner sealing surface 128 as can be seen in FIG. 6. Further provided on each sealing flange or openings 118 through which connectors such as bolts 120 can be passed so that a sealed bolted connection, for example, can be provided using bolts 120 and nuts 122. It should be understood that other suitable means of clamping, adhesion materials, welding, gluing or the like could be used to complete a sealable connection of casing halves 113 and 114 together. In FIG. 1 of the preferred embodiment, a bolt 120 and nut 122 is shown as a connection for allowing removal of the entire leak detection apparatus 110 as desired with minimal time and labor involved.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. An apparatus for detecting leaks in suspect pipe fittings comprising:
   a. a removable enclosure for encapsulating a suspect pipe fitting where leakage might occur;
   b. the enclosure forming a space adjacent the fitting for collecting fluid leaking from the fitting; and
   c. a pneumatically actuated relay connected with the space for responding to a pressure increase within the enclosure caused by leaking fluid by using the leaking fluid as instrumentation fluid to operate the pneumatically actuated relay.

2. The apparatus of claim 1, wherein the enclosure is a pliable bladder jacket.

3. The apparatus of claim 1, wherein the fitting includes an oil/gas well choke jacket.

4. The apparatus of claim 1, and further including a valve which controls fluid flowing through the fitting and movable between open and closed positions, fluid circulation means for maintaining the valve in open position when control fluid circulates therethrough and closing the valve when fluid circulation is stopped, the controller being connected to the fluid circulation means and operating to stop circulation in response to a pressure increase caused by said leaking fluid.

5. A method for detecting leaks in suspect pipe system fittings, comprising the steps of:
   a. forming a defined space adjacent the fitting which is suspect of leakage;
   b. collecting any leaks from the suspect fitting in the defined space; and
   c. using the collected leakage as instrumentation fluid to operate a pneumatic relay in response to a pressure increase in the space caused by leakage from the fitting.

6. The method of claim 5, wherein step "a" includes encapulating the fitting with an enclosure.

7. The method of claim 5, and further including the steps of closing a valve which controls fluid flow through the fitting by the use of an instrumentation fluid stream that is transmitted normally to an operator of the valve by the pneumatic relay.

8. The method of claim 7, when step of closing the valve includes interrupting the flow of high pressure fluid which operates to maintain the valve in an open position.

* * * * *